(12) United States Patent
Kashani et al.

(10) Patent No.: US 11,517,976 B2
(45) Date of Patent: Dec. 6, 2022

(54) METHOD FOR MAGNETIC PULSE SOLDERING OF A STACK OF SHEETS

(71) Applicant: ADM28 S.ÀR.L, Luxembourg (LU)

(72) Inventors: Mehrdad Kashani, Chiba (JP); Ori Ben David, Tel Aviv (IL); Victor Shribman, Kiryat Ono (IL)

(73) Assignee: ADM 28 S.A.R.L., Luxembourg (LU)

( * ) Notice: Subject to any disclaimer, the term of this patent is extended or adjusted under 35 U.S.C. 154(b) by 815 days.

(21) Appl. No.: 16/343,406

(22) PCT Filed: Nov. 10, 2017

(86) PCT No.: PCT/EP2017/078943

§ 371 (c)(1),
(2) Date: Apr. 19, 2019

(87) PCT Pub. No.: WO2018/087322

PCT Pub. Date: May 17, 2018

(65) Prior Publication Data

US 2019/0262932 A1 Aug. 29, 2019

(30) Foreign Application Priority Data

Nov. 14, 2016 (FR) .................................. 16 60982

(51) Int. Cl.
*B23K 20/00* (2006.01)
*B23K 20/06* (2006.01)
(Continued)

(52) U.S. Cl.
CPC .......... *B23K 20/06* (2013.01); *B23K 2101/38* (2018.08); *B23K 2103/10* (2018.08); *B23K 2103/12* (2018.08)

(58) Field of Classification Search
CPC ........ B23K 20/06–085; B23K 2101/38; B23K 2103/10; B23K 2103/12; B23K 2101/02–045
(Continued)

(56) References Cited

U.S. PATENT DOCUMENTS 5,966,813 A * 10/1999 Durand .................. B23K 20/06
29/520
5,981,921 A * 11/1999 Yablochnikov ........... F16C 3/02
219/617
(Continued)

FOREIGN PATENT DOCUMENTS

DE 10 2014 223138 A1 5/2016
JP 2003 117662 A 4/2003
(Continued)

OTHER PUBLICATIONS

Machine tranlsation of JP-2015-89560A (no date available).*

*Primary Examiner* — Kiley S Stoner

(57) ABSTRACT

A method for the magnetic pulse soldering of an item having a stack of sheets consisting of a metal material. At least one hole through a thickness of the stack is formed. The first and second plates, both consisting of a metal material, are arranged on either side of the stack. A covering area covering at least one through-hole is formed. The plates-stack assembly is positioned opposite an active part of a coil such that a working area of the covering area faces the active part of the coil and the working area covering at least one hole. The working area is subjected to a magnetic field until the assembly is joined. While the working area is subjected to the magnetic field, pressure is exerted on the first plate, in the region of at least one hole, pressing the first plate against the second plate.

5 Claims, 2 Drawing Sheets

(51) Int. Cl.
  *B23K 103/10*   (2006.01)
  *B23K 101/38*   (2006.01)
  *B23K 103/12*   (2006.01)

(58) Field of Classification Search
  USPC .................................... 228/3.1, 115, 235.1
  See application file for complete search history.

(56) References Cited

U.S. PATENT DOCUMENTS

| | | | |
|---|---|---|---|
| 6,389,697 B1* | 5/2002 | Benoit | B62D 27/023 |
| | | | 219/617 |
| 10,546,769 B2* | 1/2020 | Shirakawa | H01L 21/6835 |
| 2002/0003159 A1* | 1/2002 | Gabbianelli | B21D 26/14 |
| | | | 228/155 |
| 2005/0092474 A1* | 5/2005 | Seidel | F28F 3/08 |
| | | | 165/166 |
| 2006/0131300 A1* | 6/2006 | Yablochnikov | F16D 1/068 |
| | | | 219/617 |
| 2006/0138199 A1* | 6/2006 | Chen | B23K 13/015 |
| | | | 228/115 |
| 2007/0029326 A1* | 2/2007 | Gafri | B23K 13/01 |
| | | | 220/309.1 |
| 2010/0059254 A1* | 3/2010 | Sugiyama | H05K 3/361 |
| | | | 219/617 |
| 2011/0100979 A1* | 5/2011 | Keong | B23K 20/06 |
| | | | 219/617 |
| 2017/0038349 A1* | 2/2017 | Dessort | G01N 30/6095 |

FOREIGN PATENT DOCUMENTS

| | | | |
|---|---|---|---|
| JP | 2006-150389 A | 6/2006 | |
| JP | 2015 089560 A | 5/2015 | |

\* cited by examiner

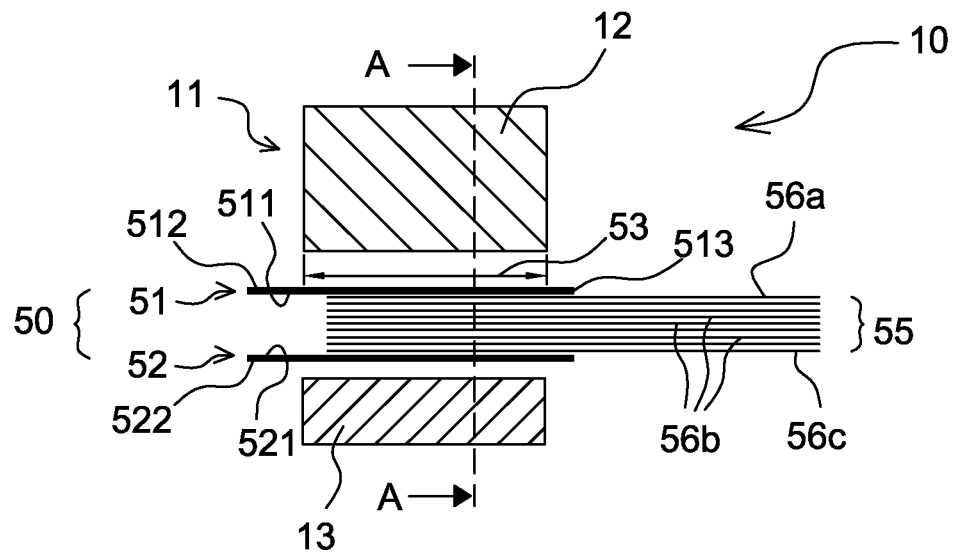
Fig.1
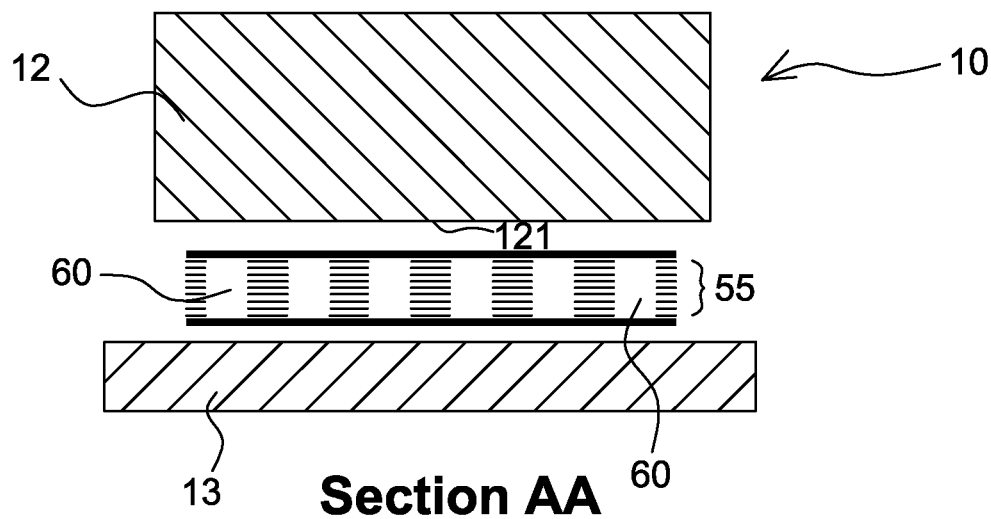
Section AA
Fig.2
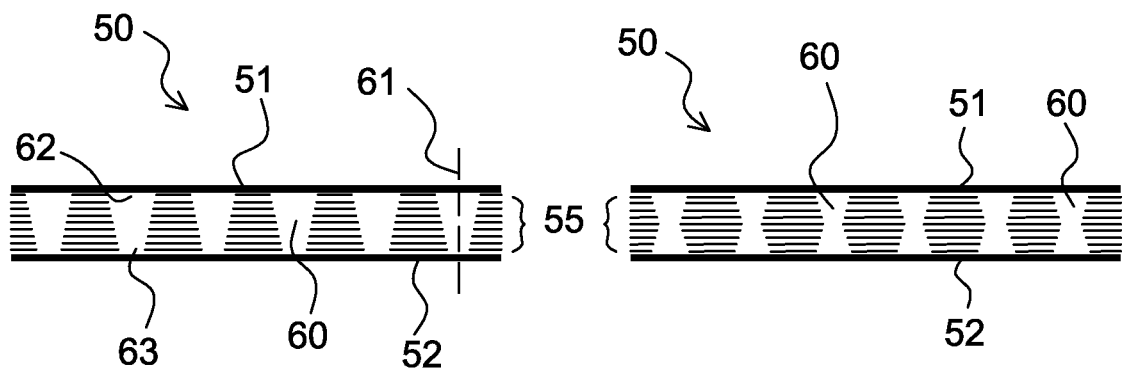
Fig.3
Fig.4

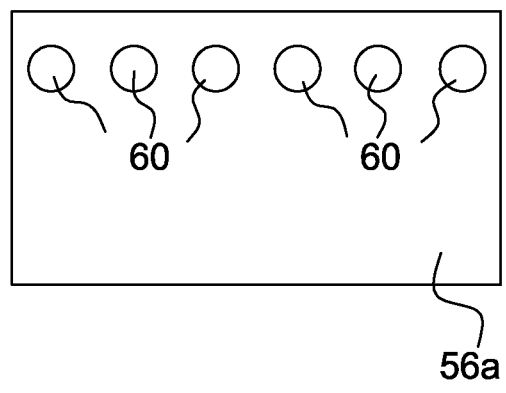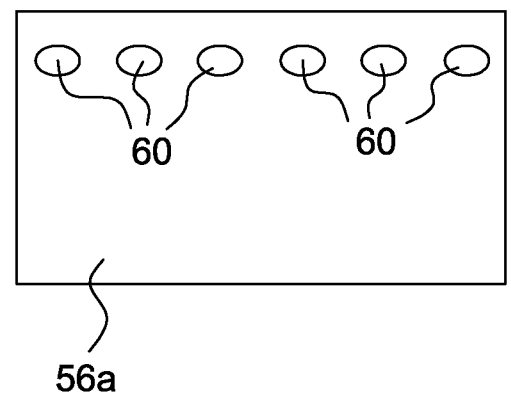
Fig.5     Fig.6

METHOD FOR MAGNETIC PULSE SOLDERING OF A STACK OF SHEETS

RELATED APPLICATIONS

This application is a § 371 application of PCT/EP2017/078943 filed Nov. 10, 2017, which claims priority from French Patent Application No. 16 60982 filed Nov. 14, 2016, each of which is incorporated herein by reference in its entirety.

FIELD OF THE INVENTION

The present invention is in the field of welding, and more particularly the field of magnetic pulse welding, for the assembly of parts to each other in a permanent manner. The present invention relates in particular to a method for welding a stack of sheets made of metal material.

BACKGROUND OF THE INVENTION

Today, there is an increasing need in industry, in particular in the motor vehicle field, for items formed from the stacking of several tens of sheets made of metal material comprised between two plates, made of metal material. Each sheet has a small thickness, generally of approximately 0.01-0.02 mm. Each plate has a large thickness, generally of approximately 0.2-0.5 mm. Such items are in particular intended for forming lithium-ion electric batteries.

The difficulty of producing these items lies in the requirement of ensuring good electrical conductivity between these various sheets and plates.

Currently, the techniques used to assemble these sheets and the plates are ultrasonic welding and laser welding. The weld between two parts is made via the heat generated at the interface between the two parts.

Although these assembly techniques are rapid and economical, they have certain disadvantages.

These techniques, on the one hand, do not allow to sufficiently compress the sheets together, and on the other hand, can cause local heating in the sheets which can lead to the creation of holes deteriorating the quality of the final weld and consequently decreasing the electrical conductivity of the assembly.

OBJECT AND SUMMARY OF THE INVENTION

The present invention aims to overcome the aforementioned disadvantages.

The goal of the present invention is in particular to provide an effective solution allowing to assemble metal sheets having a small thickness, while ensuring the electrical conductivity of the item obtained.

Additional goals of the invention are that this method is simple and rapid to implement.

For this purpose, the present invention proposes a method for magnetic pulse welding of an item comprising a stack of sheets made of metal material.

A generic definition of magnetic pulse welding is the creation of a weld between two metal parts by pressing one against the other in a zone of overlapping, without supplying outside heat. The principle of such a method lies mainly in the high-speed impact of the parts via electromagnetic forces generated by a coil.

The method according to the invention comprises:
the creation, in a thickness of the stack, of at least one through-hole,
the placement of two plates made of metal material on either side of the stack, forming a zone of overlapping covering the at least one through-hole,
the positioning of the plates-stack assembly opposite an active portion of a coil, in such a way that a working zone of the zone of overlapping is disposed facing said active portion of the coil, said working zone covering the at least one hole,
the magnetic pulse welding of the plates-stack assembly.

The plates are disposed opposite the stack in such a way as to sandwich said stack. The plates do not comprise holes opposite the through-holes of the stack, when they are positioned on either side of said stack.

The welding of the plates-stack assembly is carried out by subjecting the working zone to a magnetic field of the coil.

The magnetic field coming from the active portion of the coil exerts, at the working zone, a pressure on the plate closest to the coil.

A pressure is thus exerted on one of the plates, called first plate, and presses it against the sheet directly in contact with said plate. This sheet is in turn pressed against an adjoining sheet, and so on until the last sheet of the stack. As for this last sheet, it is pressed against the other plate, called second plate.

At the at least one through-hole, this pressure is exerted on the first plate and presses it against the second plate guaranteeing a permanent weld between the two plates. Presses against the second plate means that the first plate strikes the second plate. In other words, at the at least one through-hole, there is direct contact between the first plate and the second plate. The weld between the two plates, made in the through-hole, actually has the shape of an annular weld at the periphery of said hole.

Thus, when the working zone is subjected to the magnetic field generated by the coil ensuring the welding via pressure, the two plates closely press, at the at least one through-hole, against one another by acceleration and deformation of the plate closest to the coil in the direction of the other plate, trapping the sheets.

It is also possible to exert a pressure simultaneously on the two plates.

Such a method allows to weld the two plates to each other in the at least one through-hole, which allows to maintain the sheets in place and advantageously limit the later delamination of the sheets.

Such a method also allows to improve the electrical conductivity of the item via on the one hand the direct contact between the two plates and on the other hand the contact of the sheets with the first plate at the periphery of the through-holes.

One advantage of such a magnetic pulse welding method also lies in the fact that the assembly of the parts forming the item, that is to say the two plates and the sheets, is carried out in the solid state, which allows to avoid all the known problems of conventional welding involving the melting of the materials. The energy losses are thus minimal and consequently the parts to be welded forming the item are not greatly heated. The lack of melting in the parts during the welding thus allows to assemble materials having a different melting point.

Thus, it is possible for example to assemble plates made of copper, which is a very good conductor of electricity, and sheets made of aluminium.

According to specific modes of implementation, the method according to the invention further satisfies the following features, implemented separately or in each of their technically effective combinations.

In specific modes of implementation of the invention, in order to improve the contact between the sheets and the plates, at least one through-hole, preferably all, is made in the shape of a truncated cone, for example of revolution or oblique.

In an alternative implementation, in the case in which a pressure is exerted simultaneously on the two plates, at least one through-hole, preferably all, is made in the shape of two inverted truncated cones connected to one another at their small base.

In specific modes of implementation of the invention, in order to elongate the weld between the plates in a hole, said through-hole is made in the shape of a cylinder having an elliptical transverse cross-section.

In specific modes of implementation of the invention, the through-hole is made in such a way as to have a mean axis oriented substantially perpendicularly to a face of one of the two plates.

In an alternative implementation, the through-hole is made in such a way as to has a mean axis inclined with respect to a perpendicular to a face of one of the two plates, at said through-hole.

The invention also relates to an item comprising a stack of sheets made of metal material between two plates made of metal material. The stack comprises, in its thickness, a through-hole. The stack is comprised between the two plates, at a zone of overlapping covering the through-hole. The plates-stack assembly is welded in an irreversible manner, at a portion of the zone of overlapping covering the hole. The plates-stack assembly is magnetic pulse welded. The two plates are welded to each other at the through-hole.

Preferably, the item is obtained using the welding method according to at least one of the modes of implementation.

The item obtained is advantageous in that it allows, via welding of the two plates to each other at the hole, the sheets to remain in position between the plates without risk of later delamination.

Via on the one hand the direct contact between the two plates and on the other hand the contact of the sheets with the first plate at the periphery of the through-holes, the electrical conductivity of the item is ensured.

According to preferred embodiments, the invention further satisfies the following features, implemented separately or in each of their technically effective combinations.

According to specific modes of the invention, the through-hole is in the shape of a truncated cone, for example of revolution or oblique. Such an embodiment advantageously allows to improve the contact between the sheet and the plates.

According to specific modes of the invention, the through-hole in the stack is in the shape of a cylinder having an oval cross-section.

According to specific modes of the invention, the stack comprises two through-holes, having the same transverse cross-section and the same size, said holes being spaced apart from each other by the size of a through-hole.

BRIEF DESCRIPTION OF THE DRAWINGS

The invention will be better understood upon reading the following description made in reference to the appended drawings:

FIG. 1 schematically shows a lateral view of an item comprising a stack of sheets positioned in a welding device adapted for magnetic pulse welding in preparation for its welding, FIG. 2 illustrates a cross-sectional view of the welding device of FIG. 1, FIGS. 3 and 4 show alternatives of shapes of the holes in the thickness of the stack of sheets, FIGS. 5 and 6 show a top view of a sheet illustrating alternatives of transverse cross-sections of the holes,

DETAILED DESCRIPTION OF AN EMBODIMENT OF THE INVENTION

FIG. 1 schematically describes a welding device 10 adapted for the magnetic pulse welding of an item 50 comprising at least one stack 55 of sheets 56.

The various parts forming the item 50 can have a flat shape, or alternatively, a tubular shape.

Flat shape means that the parts have at least one surface having a flat, or substantially flat, shape over all or a portion of their length, at least at a zone of overlapping of the parts with each other.

Tubular shape means that the parts have the shape of a tube over all or a portion of their length, at least at a zone of overlapping of the parts with each other.

Here, the invention is described in a detailed manner in the case of welding of a stack 55 of sheets 56 having a flat shape.

The welding device 10 comprises, in a known manner, a coil 11, a storage unit (not shown) and one or more switches (not shown).

The storage unit is configured and intended to accumulate a strong energy, for example of approximately several tens of kilojoules (kJ).

In a preferred example of embodiment, the storage unit is an array of discharge capacitors.

As for the coil 11, it is configured and intended to create a magnetic field concentrated in a defined space.

The Coil

The coil 11 comprises a body 12. This body 12 is made from a material having specific characteristics in terms, on the one hand, of mechanical resistance to plastic deformation and on the other hand of high electrical conductivity in order to make a current with a very high intensity, of approximately several hundred thousand Amperes, circulate therein.

In a preferred example of embodiment, the material of the body is made of steel, preferably, high strength steel.

When the switch(es) close, the body 12 is connected to the storage unit, and a current with a strong intensity circulates through it producing a magnetic field.

The coil 11 is designed in order for the density of the current in a zone of said coil, to be sufficient to satisfy the welding conditions. This zone is called active portion 121.

As a reminder, in order for the welding to take place, a plurality of parameters must be taken into account, in particular the angle of collision and the speed of collision. These two parameters are related to the initial relative arrangement of the coil and of the parts to be welded, to the materials of the parts and to the current signal used. These parameters are known to a person skilled in the art and will not be described in detail here.

The current is concentrated, in the active portion, on a layer defined by an active portion and having a thickness corresponding to the skin depth.

In the non-limiting example of a coil made from steel, the skin depth is approximately several millimetres for a frequency of several tens of kHz.

For the desired use, namely the welding of a stack 55 of sheets, it is necessary to concentrate the magnetic field in a very fine skin depth, for example of approximately 0.3 mm for a plate made of copper. In order to concentrate the magnetic field in such a skin depth, the frequency generated is at least greater than 25 kHz.

In another example in which it is desired to concentrate the magnetic field in a skin depth of less than 0.1 mm, the frequency generated is at least greater than 70 kHz.

The Item to be Welded

The item 50 to be welded comprises a stack 55 of sheets and two plates, called first plate 51 and second plate 52.

The stack 55 comprises a superposition of sheets. It comprises a first sheet $56_a$, a last sheet $56_c$, and between these two sheets, intermediate sheets $56_b$.

The stack 55 is sandwiched between all or a portion of the two plates 51, 52. In other words, all or a portion of an inner face 511 of the first plate 51 is disposed against the first sheet $56_a$ and all or a portion of an inner face 521 of the second plate 52 is disposed against the last sheet $56_c$.

The stack 55 and the two plates 51, 52 are intended to be disposed on top of each other, in such a way as to form a shared zone of superposition, called zone of overlapping 53, and to then be welded at all or a portion of said zone of overlapping by the coil 11.

The stack 55 and the two plates 51, 52 are positioned on top of each other in a substantially parallel manner, at least at the zone of overlapping 53.

Preferably, the zone of overlapping 53 is located at an end of at least one plate, for example an end 513 of the first plate 51.

Each plate 51, 52 can have a thickness between for example 200 and 400 µm.

Each plate 51, 52 is preferably made from a metal material.

In a non-limiting preferred example, the plates 51, 52 are made of aluminium.

In another non-limiting example, the plates 51, 52 are made of copper.

In another embodiment, the two plates 51, 52 are made from different metal materials.

In the example illustrated by FIGS. 1 to 4, the stack 55 comprises nine sheets, without this being limiting to the invention.

Although the sheets are illustrated in the drawings and described as being 9, the number of these sheets is not limited to that described and illustrated. Thus, it is possible, without straying from the context of the invention, to create a stack 55 comprising less than ten sheets or several tens of sheets.

Preferably, the stack 55 comprises at least 40 sheets.

Each sheet has for example a thickness of 20 µm.

Each sheet is preferably made from a metal material.

In a non-limiting preferred example, the sheets are made of aluminium.

It is also possible to create a stack 55 from sheets made from different metal materials.

The stack 55 has, in its thickness, and by extension every sheet, a plurality of through-holes 60. In the rest of the description, a through-hole will be called a hole.

It is of course obvious that the stack 55 can only comprise, in its thickness, a single hole 60. The description below also applies to this case.

The holes 60 are positioned in the stack 55 in such a way that when the two plates 51, 52 and the stack 55 are assembled, the holes 60 are located in the zone of overlapping 53.

When the two plates 51, 52 between which the stack 55 is positioned are in position with said stack in preparation for their welding, said two plates do not have holes facing the holes 60 made in the stack, as illustrated in FIGS. 2 to 4.

In one example of embodiment, the holes 60 are substantially aligned. FIGS. 2 to 4 illustrate a cross-section of the item 50, at a line of holes 60, before the welding operation.

In the example illustrated in FIGS. 2 to 4, there are six holes 60.

Although the holes 60 are illustrated in the drawings and described as being six, the number of these holes is not limited to that described and illustrated. Thus, it is possible, without straying from the context of the invention, to create a stack 55 with a number of holes less than or greater than 6.

The number of holes 60 is obviously dependent on the dimensions of the stack 55.

The number, the shape and the size of the holes is chosen according to the dimensions of the zone of overlapping and/or the thickness of the stack.

In one embodiment, illustrated in FIGS. 2 to 4, a hole 60, preferably all the holes, is made in the stack 55 in such a way that said hole has, regardless of its shape, a mean axis 61 oriented substantially perpendicularly to the inner face of the first 51, or second plate 52, at said hole.

In another embodiment, the mean axis of the hole 60 is inclined substantially with respect to an axis perpendicular to the inner face of the first, or second, plate, at said hole.

In one example of embodiment of holes, as illustrated in FIG. 2, the holes 60 have a cylindrical shape.

Cylindrical shape means a shape having a constant cross-section between the inner face 511 of the first plate 51 towards the inner face 521 of the second plate 52.

The cylindrical shape encompasses any shape of transverse cross-section, for example such as an elliptical, circular, square, rectangular or polygonal cross-section.

In one form of embodiment, the holes 60 have a cylindrical shape, having a circular transverse cross-section. FIG. 5 illustrates a top view of a sheet, for example the first sheet $56_a$, comprising 6 holes having a circular transverse cross-section.

In another form of embodiment, the holes 60 have a cylindrical shape, having an elliptical transverse cross-section. FIG. 6 illustrates a top view of a sheet, for example the first sheet $56_a$, comprising 6 holes having an elliptical transverse cross-section.

In an alternative embodiment of holes, as illustrated in FIG. 3, the holes 60 have a shape substantially that of a truncated cone, with a large base 62 located near the inner face 511 of the first plate 51 and a small base 63 located near the inner face 521 of the second plate 52.

Shape substantially that of a truncated cone means a shape having a monotone decreasing or increasing transverse cross-section, decreasing here from the inner face 511 of the first plate 51 to the inner face 521 of the second plate 52.

The expression "truncated cone" used to describe the shape of the hole is to be taken in the broad sense encompassing all shapes of cross-section of the truncated cone, for example such as an elliptical, circular, square, rectangular or polygonal cross-section.

The truncated cone can be a truncated cone of revolution or an oblique truncated cone.

In an improved alternative of embodiment of holes, the holes 60 have the shape of two inverted hollow truncated cones connected to one another at their small base, in such a way as to have the shape of a diabolo. A first truncated cone has a large base located near the inner face 511 of the first plate 51. A second truncated cone has a large base located near the inner face 521 of the second plate 52. Preferably, the two truncated cones are coaxial.

In one form of embodiment, the two truncated cones have the same dimensions.

In another form of embodiment, the two truncated cones are asymmetrical.

The present invention is not limited to a stack 55 with holes 60 having the same shape. A stack 55 can comprise holes 60 having different shapes. A person skilled in the art is capable of adapting the invention to shapes and arrangements not described.

In the example of FIGS. 2 to 6, two adjacent holes 60 are spaced apart two by two by a distance equivalent to a maximum dimension of the transverse cross-section of a hole.

In the example of FIG. 5, the holes 60, having the same circular transverse cross-section, are all spaced apart two by two by a distance substantially equal to the diameter of the holes.

Preferably, the holes 60 have a diameter of 50 mm and are spaced apart from each other by 50 mm.

An example of a method for welding the item 50 is now described. The welding method is preferably carried out using the welding device 10 described above.

In a previous step, the holes 60 are made in the stack 55.

The holes 60 are made in the stack at the location at which a weld via magnetic pulses is desired on the item.

In one mode of implementation, the sheets 56 are previously stacked, then the holes are made simultaneously for all the sheets.

In another mode of implementation, the holes are made for each sheet and then the sheets are stacked in such a way as to align the mean axes 61 of the holes 60.

In one example of implementation, the holes 60 are made by machining, for example by piercing or by punching.

In a later step, the parts forming the item to be welded, that is to say the stack 55 and the two plates 51, 52, are assembled.

The two plates 51, 52 are disposed on either side of the stack 55, forming the zone of overlapping 53 covering at least the holes 60 previously made.

The inner face 511 of the first plate 51 is disposed against the first sheet. The inner face 521 of the second plate 52 is disposed against the last sheet.

The method then comprises a step of positioning the plates-stack assembly in the welding device 10.

The stack 55 and the two plates 51, 52 are advantageously positioned at the coil 11 in such a way that all or a portion of the zone of overlapping 53 is opposite the active portion 121 of said coil.

The zone of overlapping 53 opposite the active portion 121 of the coil is called working zone. The working zone covers the holes 60.

In the non-limiting example of FIGS. 1 and 2, the first plate 51 is the part closest to the active portion 121 of the coil. An outer face 512 of the first plate 51 is disposed opposite the active portion 121 of the coil. An outer face 522 of the second plate 52 is disposed opposite a block 13.

The two plates 51, 52 and the stack 55 are maintained, near the active portion 121 of the coil 11, in a manner substantially parallel to each other, at least in the zone of overlapping 53, by fastening means (not shown in the drawings).

After these steps, the item is ready to be welded.

The order of implementation of the two previous steps is not imposed and, according to the method, can be carried out in the order inverse to the order described or carried out simultaneously without modifying the result of said steps.

The method then comprises a step of magnetic pulse welding.

When the switch(es) 51 close, the body 12 of the coil 11 is connected to the storage unit, and a current with a strong intensity circulate in the coil 11. The current generates, in a defined space between the working zone and the active portion 121, a concentrated magnetic field coming from said active portion.

The working zone is then subjected to a magnetic field in such a way that:

a pressure is exerted on the outer face 512 of the first plate 51 and presses it closely against the first sheet $56_a$, which is in turn pressed closely against the second sheet and so on until the last sheet $56_c$ is pressed closely against the inner face 521 of the second plate 52, causing their bonding in a permanent manner, and at the holes 60, this pressure is exerted on the outer face 512 of the first plate 51 and presses said first plate closely against the inner face 521 of the second plate 52.

After this step, the item 50 is welded at the working zone. The two plates 51, 52 and the stack 55 are connected to each other by welding between the holes 60, and the two plates 51, 52 are connected to each other by welding in the holes 60.

In an exemplary embodiment the stack comprises 40 sheets 56 made of aluminum. The two plates are made of aluminum. The zone of overlapping 53 has a size of 430 mm in length and 120 mm in width. The holes are cylindrical, have the same circular transverse cross-section, have a diameter of 50 mm, are 5 in number and are spaced apart two by two by 50 mm.

The method can also be adapted to tubular parts.

The above description clearly illustrates that by its various features and their advantages, the present invention reaches the goals set. In particular, it provides a method for magnetic pulse welding adapted to the welding of parts comprising a stack of sheets.

The invention claimed is:

1. A method for magnetic pulse welding of an item comprising a stack of sheets made of a metal material, comprising steps of:
   forming at least one through-hole in a thickness of the stack;
   placing a first plate and a second plate, both made of the metal material, on either side of the stack to form an overlapping zone covering said at least one through-hole;
   positioning a plates-stack assembly opposite an active portion of a coil, such that a working zone of the overlapping zone is disposed facing an active portion of the coil, the working zone covering said at least one through-hole; and
   subjecting the working zone to a magnetic field until bonding of the plates-stack assembly, a pressure being exerted on the first plate and pressing the first plate, at said at least one through-hole, against the second plate, so that there is a direct contact and a permanent weld between the first plate and the second plate.

2. The welding method according to claim 1, wherein said at least one through-hole is made in a shape of a truncated cone.

3. The welding method according to claim 1, wherein said at least one through-hole is made in a shape of a cylinder having an elliptical cross-section.

4. The welding method according to claim 1, wherein said at least one through-hole is made such that a mean axis is oriented perpendicularly to a face of one of the first and second plates.

5. The welding method according to claim 1, wherein said at least one through-hole is made such that a mean axis is inclined with respect to an axis perpendicular to a face of one of the first and second plates, at said at least one through-hole.

* * * * *